Figure 1:
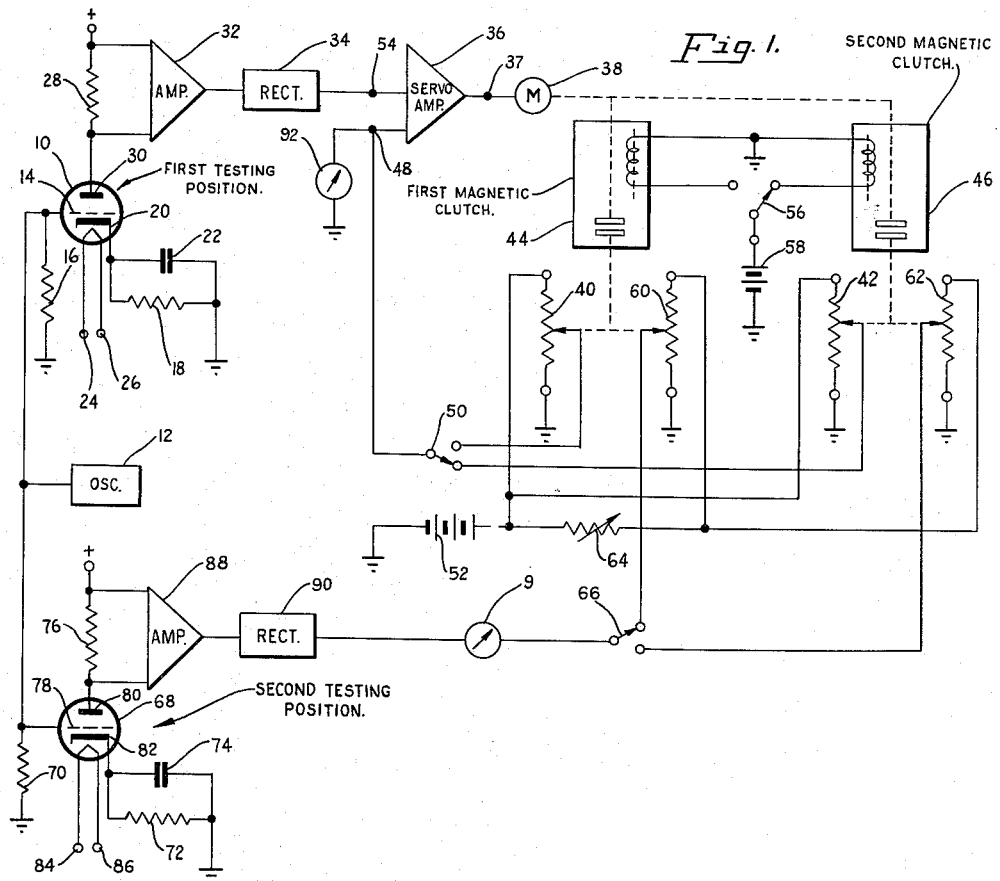

Aug. 15, 1961  G. D. HAVILLE  2,996,659
METHOD AND APPARATUS FOR TESTING ELECTRON TUBES
Filed Dec. 16, 1957

GEORGE D. HAVILLE,
INVENTOR

BY

ATTORNEY

United States Patent Office 2,996,659
Patented Aug. 15, 1961

2,996,659
METHOD AND APPARATUS FOR TESTING ELECTRON TUBES
George D. Haville, Tucson, Ariz., assignor to Hughes Aircraft Company, Culver City, Calif., a corporation of Delaware
Filed Dec. 16, 1957, Ser. No. 703,214
6 Claims. (Cl. 324—24)

This invention relates to electron tube testers and testing methods, and particularly to apparatus and methods for measuring the change in transconductance of an electron tube for a change in heater voltage.

It is well known by those skilled in the art that one indication of the quality or figure of merit of an electron tube is the grid to plate mutual conductance or transconductance. However, increasingly critical circuits and applications for electron tubes are being developed and a mere measurement of the normal transconductance alone does not always provide sufficient indication that a given electron tube will perform satisfactorily under all conditions. For instance, an electron tube which has a satisfactory normal transconductance and operates satisfactorily as an amplifier may not operate satisfactorily as an oscillator or in pulsed operation. Additionally, the measurement of normal transconductance alone provides little indication of the future reliability of an electron tube.

The measurement of the decrease in transconductance of an electron tube caused by a known decrease in filament voltage is known as delta transconductance or filament slump. The delta transconductance, together with the normal transconductance, provides a very good indication of the age of an electron tube, its future reliability and its suitability for critical modes of operation. Although the measurement of delta transconductance, as well as normal transconductance, is being increasingly employed, no suitable methods or apparatus for readily performing both of these measurements has been available.

Accordingly, it is an object of the present invention to provide a novel method for measuring both normal transconductance and delta transconductance of an electron tube.

Another object of the invention is the provision of novel apparatus for measuring both normal transconductance and delta transconductance of an electron tube.

A further object of this invention is to provide apparatus for measuring normal transconductance and delta transconductance of an electron tube automatically.

Yet another object of the invention is the provision of improved apparatus for testing electron tubes at a very rapid rate.

A still further object of the present invention is to provide novel electron tube transconductance testing apparatus which may be used compatibly with equipment for testing other characteristics of electron tubes in an automatic high rate tube testing system.

An even further object of the invention is the provision of improved apparatus suitable for the measurement of transconductance of a wide variety of electron tube types.

In accordance with the invention, the normal and delta transconductance of an electron tube may be measured, for example, by the method of applying normal filament voltage to the electron tube to be tested. A signal is then amplified through the electron tube. The amplified signal is displayed as an indication of the normal transconductance of the electron tube. The amplified signal is also reduced by an amount proportional to the maximum allowable delta transconductance for a predetermined reduction of filament voltage. The reduced amplified signal is then stored and the filament voltage applied to the electron tube is reduced to the predetermined value. The signal is again amplified through the electron tube. The difference between the stored signal and the amplified signal produced at reduced filament voltage is then determined. This difference signal is then displayed as an indication of the relationship between the actual and the maximum allowable delta transconductance of the electron tube.

Apparatus in accordance with the invention may, for example, comprise first circuit means in which a tube under test operates at normal filament voltage. The first circuit means produces a signal whose amplitude corresponds to the normal transconductance of the tube under test. Indicating apparatus is provided to indicate the normal transconductance of the tube. There is provided servo-driven potentiometer means to store a voltage proportional to the normal transconductance of the tube. Second circuit means is provided in which the tube under test operates at a predetermined value of reduced filament voltage. The second circuit means produces a voltage representative of the transconductance of the tube under test at the predetermined value of reduced filament voltage. Voltage reducing means is provided for reducing the stored voltage to a value proportional to the maximum allowable reduction in transconductance for the predetermined reduction in filament voltage. There is also provided a comparison device to compare the stored voltage with the voltage produced by the second circuit means and to indicate the difference voltage.

Figure 2:
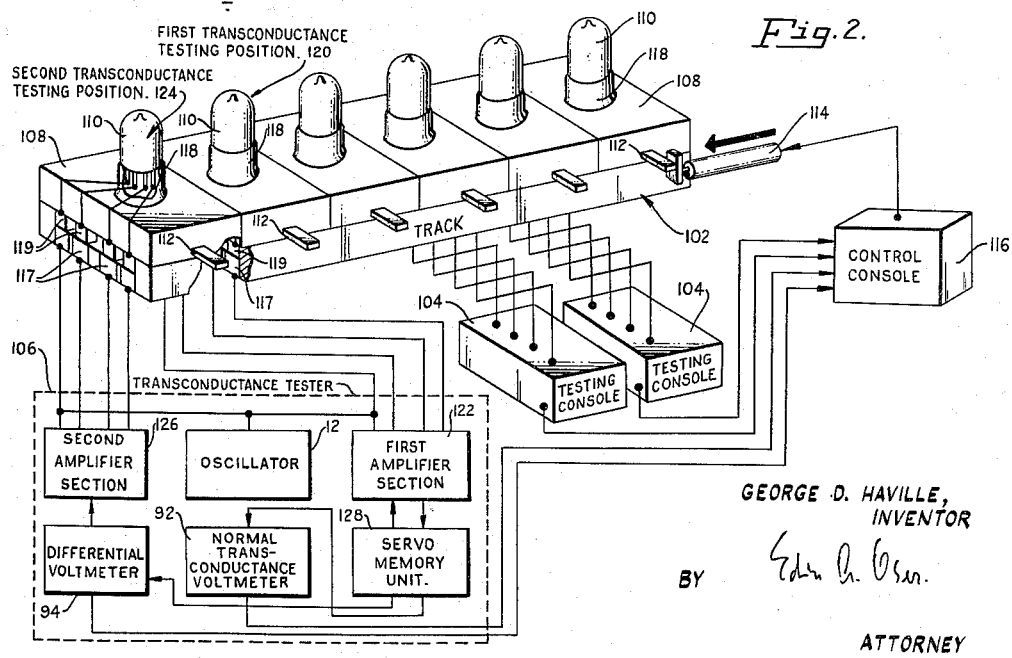

For a better understanding of the invention, together with other and further objects thereof, reference is made to the following description, taken in connection with the accompanying drawing in which like reference numerals designate like parts throughout the figures thereof and wherein:

FIG. 1 is a schematic diagram, partially in block form, of a transconductance tester employing the present invention; and FIG. 2 is a diagrammatic view, partially in block form, of a tube testing system incorporating the transconductance tester of FIG. 1.

Referring now to the drawing, there is shown in FIG. 1 an electron tube 10 to be tested. The electron tube 10 is provided with a grid 14, a cathode 20 and an anode 30. It will be understood by those skilled in the art to which the invention pertains, that although a triode is depicted by way of example, the invention is not limited to the testing of triodes. Further, the inclusion of the cathode 20 is by way of example only, as the invention may be applied to filamentary type tubes as well as tubes having indirectly heated cathodes.

The tube 10 is interconnected with electronic circuit means which may comprise, for example, an amplifier circuit. Such an amplifier circuit is illustrated in FIG. 1 as having a grid return resistor 16 connected from the grid 14 to ground. A cathode bias resistor 18 is shown connected between the cathode 20 and ground and the cathode resistor 18 is bypassed by a capacitor 22. A plate load resistor 28 is provided between the anode 30 and a source of positive potential. If it is desired to establish a directly proportional relationship between the signal which appears across the plate load resistor 28 and the transconductance of the tube 10, the plate resistor 28 may be chosen to have a value much lower than the plate resistance of the tube 10. In the case of a type 6111 tube whose plate resistance is nominally 4000 ohms, a plate resistor 28 having a value of 100 ohms, for example has been found suitable to provide this directly proportional relationship.

The electron tube 10 has applied to it normal rated filament voltage at the filament or heater terminals 24, 26. It will be understood that, because the invention is not limited to applications involving either filamentary or indirectly heated type tubes, the terms filament and filament voltage will be used interchangeably with heater and heater voltage throughout.

If the value of the plate load resistor 28 is chosen to be small compared to the plate resistance of the tube 10, the signal which will appear across the plate load resistor 28 will be small. In such a case it may be desirable to amplify the signal to a suitable level compared to the electrical noise inherent in the apparatus and coupled into the apparatus from local electrical disturbances. Accordingly, an amplifier 32 may be provided which has its input coupled to the plate load resistor 28. The amplifier 32 may be provided with a gain control for calibration purposes, if desired. If the electron tube 10 is tested with a single frequency signal, the amplifier 32 may be designed to amplify only that frequency and thus provide an even more favorable signal to noise ratio.

In the exemplification of the invention shown in FIG. 1, the signal is rectified to provide a D.C. voltage by a rectifier 34 which may be, for example, a semiconductor device. The rectifier 34 is connected to the output terminals of the amplifier 32.

A second tube 68 is illustrated as being tested at a second testing position. The second tube 68 is also provided with a grid 78, an anode 80 and a cathode 82. The second tube 68 is coupled into second electronic circuit means which may be identical with the aforedescribed first electronic circuit means. The grid 78 is returned to ground through a grid resistor 70. The cathode 82 is connected to a cathode bias resistor 72 which is connected to ground. The cathode bias resistor 72 may be bypassed by a suitable capacitor 74. A plate load resistor 76 is connected between the anode 80 and a source of positive potential. This plate load resistor 76 may also be chosen to have a low value of resistance compared to the plate resistance of the second tube 68. A second amplifier 88 may have its input terminals coupled to the plate load resistor 76. This second amplifier 88 may be identical with the first amplifier 32. The signal from the second tube 68 is also rectified to provide a D.C. voltage. A second rectifier 90 is connected to the output terminals of the second amplifier 88. This rectifier 90 may also be a semiconductor device.

A signal generating device, such as an oscillator 12, is connected to the grids 14, 78 of the tubes 10, 68. If desired, the oscillator 12 may be adjusted to provide a fixed amplitude signal at a single frequency. It has been found that for fixed frequency testing a frequency of 1000 cycles per second is satisfactory for most types of electron tubes. If a value of 100 ohms is chosen for the plate load resistors 28, 76 it has been found that a suitable amplitude of signal from the oscillator 12 is 100 millivolts.

The second electron tube 68 has applied to it a filament voltage at its filament terminals 84, 86 which is less than the rated filament or heater voltage of the tube 68.

There is provided a position servo having error detecting and driving power supplying means, such as a servo amplifier 36. The servo amplifier may be a magnetic amplifier, if desired, and is provided with a signal input terminal 54, a feedback input terminal 48 and an output terminal 37. In accordance with the invention, there is provided actuating means, such as a motor 38 which is electrically connected to the output terminal 37 of the servo amplifier 36. The signal input terminal 54 is connected to the first rectifier 34 and the servo amplifier 36 is responsive to the D.C. voltage produced thereby.

First and second magnetic clutches 44, 46 are provided. Each of the magnetic clutches 44, 46 has a driving member, a driven member and an actuating coil. The shaft of the motor is mechanically coupled to the driving members of the magnetic clutches 44, 46. The actuating coils of the magnetic clutches 44, 46 are connected to a switch 56 which individually and selectively connects each of the actuating coils to a source of operating potential, such as a battery 58.

Feedback devices, such as first and second follow-up potentiometers 40, 42 are provided for inclusion in the servo loop. The slider of the first follow-up potentiometer 40 is mechanically coupled to the driving member of the first magnetic clutch 44. The slider of the second follow-up potentiometer 42 is mechanically coupled to the driving member of the second magnetic clutch 46. The slider of the first follow-up potentiometer 40 is electrically connected to one terminal of a feedback switch 50. The slider of the second follow-up potentiometer 42 is electrically connected to another terminal of the feedback switch 50. The arm of the feedback switch 50 is connected to the feedback input terminal 48 of the servo amplifier 36. Thus, by operation of the feedback switch 50 the slider of either of the follow-up potentiometers 40, 42 may be individually electrically connected to the feedback input terminal 48 of the servo amplifier 36. The follow-up potentiometers 40, 42 are connected across a source of potential, such as battery 52. A normal transconductance indicator, such as a voltmeter 92 is connected to the feedback input terminal 48 of the servo amplifier 36 and is responsive to the voltage appearing thereat. The normal transconductance meter 92 may be calibrated in micromhos, if desired.

A first memory potentiometer 60 is provided, having its slider mechanically coupled to the driving member of the first magnetic clutch 44. A second memory potentiometer 62 is provided, having its slider mechanically coupled to the driving member of the second magnetic clutch 46. The memory potentiometers 60, 62 are connected across the battery 52 through a variable resistor 64. The slider of the first memory potentiometer 60 is electrically connected to one terminal of a memory potentiometer switch 66. The slider of the second memory potentiometer 62 is connected to another terminal of the memory potentiometer switch 66.

The arm of the memory potentiometer switch 66 is connected to one terminal of a differential voltmeter 94. The other terminal of the differential meter 94 is connected to the second rectifier 90. By operation of the memory potentiometer switch 66 the differential meter 94 may be individually and alternately connected to the slider of one of the memory potentiometers 60, 62.

In operation, the oscillator 12 produces a signal which is applied to the grid 14 of the first tube 10. The first tube 10 amplifies the signal and develops an amplified signal across the plate load resistor 28 which is proportional to the transconductance of the tube at the normal filament voltage which is applied to the filament terminals 24, 26. The signal is further amplified by the amplifier 32. The signal is then rectified by the first rectifier 34 and applied to the signal input terminal 54 of the servo amplifier 36.

The servo amplifier 36, in response to the voltage at the signal input terminal 54 applies a voltage to the servo motor 38. The servo motor 38 drives the driven members of the first and second magnetic clutches 44 and 46. The magnetic clutch selector switch 56 has connected the battery 58 to the actuating coil of the magnetic clutch 46. The driving member of the second magnetic clutch 46 is therefore engaged with the driven member. The first magnetic clutch 44 is disengaged.

The slider of the second follow-up potentiometer 42 is electrically connected to the feedback input terminal 48 of the servo amplifier 36 by the follow-up potentiometer selector switch 50. The servo motor 38 thus drives the slider of the second follow-up potentiometer 42 until it reaches a potential equal in magnitude to that applied to the signal input terminal 54 of the servo amplifier 36. When this occurs, the magnitudes of the voltages applied to the two input terminals 54, 48 of the servo amplifier 36 will be equal. The servo amplifier 36 then ceases to supply a voltage to the servo motor 38 which then ceases rotation and remains stationary. The normal transconductance meter 92 then indicates the normal transconductance of the first electron tube 10.

The slider of the second memory potentiometer 62 has also been driven to a position corresponding to the normal transconductance of the first tube 10 by the servo motor 38. However, the voltage applied to the second memory potentiometer 62 by the battery 52 is reduced by the amount of the voltage dropped across the variable resistor 64. The variable resistor 64 is adjusted to provide a voltage drop proportional to the maximum allowable decrease in transconductance of the first tube 10 for a predetermined decrease in filament voltage. For example, assume that the maximum allowable delta transconductance of the first tube 10 is 15% of the measured normal transconductance for a predetermined reduction of filament voltage. Then the variable resistor 64 should be adjusted to drop 15% of the voltage of the battery 52. Thus, 85% of the voltage of the battery 52 will be applied across the memory potentiometers 60, 62. It should be evident that the voltage at the slider of the second memory potentiometer 62 will be equal to the minimum allowable value of transconductance for the first tube 10 when the filament voltage is reduced to the predetermined value. This information will be stored by the second memory potentiometer 62 when the clutch selector switch 56 is operated to deenergize the second magnetic clutch 46, thus uncoupling the second memory potentiometer 62 from the servo motor 38.

Simultaneous with the measurement of the first tube 10 at the first test position, the second tube 68 is being measured at the second test position. The oscillator 12 applies a signal to the grid 78 of the second tube 68. A reduced filament voltage which may be, for example, 5.7 volts for a 6.3 volt tube is applied to the filament terminals 84, 86. The second tube 68 develops a signal across its plate load resistor 76 which is directly proportional to the transconductance of the tube 68 at the reduced filament voltage. The signal is amplified by the second amplifier 88 and then rectified by the second rectifier 90. The gain of the second amplifier 88 is adjusted to provide the same proportionality factor as is provided in the first test position so that the voltages produced by the first and second rectifiers 34 and 90 will be comparable.

The voltage produced by the second rectifier 90 is compared with the voltage at the slider of the first memory potentiometer 60 by the differential voltmeter 94. It is assumed that the second tube 68 has previously been tested at the first test position and that the first memory potentiometer 60 is storing a voltage proportional to the minimum allowable transconductance of the tube 68 for the reduced value of filament voltage. Thus the actual value of transconductance is compared with the minimum allowable value and the differential voltmeter 94 indicates whether the second tube 68 has passed the test.

At the completion of the tests, the switches 50, 56 and 66 are operated and the second tube 68 is removed from its circuit and the first tube 10 is put in its place. A new tube may then be put in the place of the first tube 10.

Referring now to FIG. 2 which illustrates an arrangement for an automatic electron tube testing system, there is provided a track 102. The track 102 extends along a number of testing consoles 104, including a transconductance tester 106. A number of boxes 108 are provided to carry tubes 110 to be tested along the track 102. The boxes 108 move slidably along the track 102. The boxes 108 are provided with dog members 112 at the sides thereof extending normal to the track 102. The dog member 112 of the first box 108 (the right hand box, as viewed in FIG. 2) on the track 102 is engaged by an actuator 114 for automatic incremental movement of all the boxes 108 on the track 102. The actuator 114 may be hydraulically operated, and when operated moves all the boxes 108 one box length along the track 102. The actuator 114 is controlled by impulses from a control system located in a control console 116 which is described more fully below.

Each box 108 is provided with a connector such as a socket 118 to receive the pins of the tubes 110 to be tested. When a tube 110 is in a socket 118, the pins of the tube 110 are electrically connected to contacts 119 located on the bottoms of the boxes 108. The contacts engage segmental contact bars 117 provided along the surface of the track 102. The segmental contact bars 117 are connected individually into the circuitry of the testing consoles 104, including the transconductance tester 106 and are separate from each other. By this means the tubes 110 to be tested are connected sequentially into the series of the testing consoles 104 and the transconductance tester 106.

The control console 116 houses a control system which may be interconnected with all testing consoles 104. Details of the control console 116 system have not been included for simplicity and clarity in describing the invention. In accordance with well known relay switching techniques or digital control methods, however, the control console 116 may provide signals to select and operate the testing consoles 104, the transconductance tester 106 and the actuator 114 in a predetermined sequence. Thus the control console 116 effects the automatic movement of the boxes 108 along the track 102. The boxes 108 are indexed one box length at a time. Each testing console 104 may provide a signal to the control console 116 when its respective tests are completed. Each testing console 104 may also provide a signal to the control console 116 when a tube 110 has failed a test. Such signals are employed in the system incorporating the present invention to effect failure detection and automatic sequencing.

The transconductance tester 106 is the same as that shown in FIG. 1 and the details will therefore not be repeated. The pins of a tube 110 at the first transconductance testing position 120 on the track 102 are connected through the contacts 119 to the segmental contact bars 117 in the track 102. From the contact bars 117 conductors are coupled to the transconductance tester 106 at the first electronic circuit means, indicated in FIG. 1 as a grid resistor 16, a cathode bias resistor 18, a cathode bypass capacitor 22 and a plate load resistor 28, but not shown in FIG. 2. Also associated with the first testing position 120 is the first amplifier section 122, including an amplifier 32 and a rectifier 34 as shown only in FIG. 1.

Similar couplings are made from the second transconductance testing position 124 through the pins of the tube 110, the contacts 119 on the boxes 108, and the segmental contact bars 117 to the second electronic circuit means (indicated only in FIG. 1 as a grid resistor 70, a cathode bias resistor 72, a cathode bypass capacitor 74 and a plate load resistor 76). A tube 110 under test at the second transconductance testing position corresponds to the tube 68 of FIG. 1. Thus the tube 110 at the second testing position 124 is also coupled to a second amplifier 126 (including, as shown only in FIG. 1, an amplifier 88 and a rectifier 90).

An oscillator 12 is provided in the transconductance tester 106 which is connected to the first and second amplifier sections 122, 126 and to the two tubes 110. A servo memory unit 128 is provided which includes, as described in conjunction with FIG. 1, a servo amplifier 36, a servo motor 38, first and second follow-up potentiometers 40, 42, first and second memory potentiometers 60, 62, a potentiometer battery 52, and a magnetic clutch battery 58. The servo memory unit 128 is connected to the first amplifier section 122. A feedback switch 50, a magnetic clutch selector switch 56 and a memory potentiometer switch 66, shown only in FIG. 1, may be employed in this arrangement. The three switches 50, 56 and 66 may be contacts on a relay, the relay being connected into the control system located in the control console 116.

A normal transconductance voltmeter 92 is provided and is connected to the servo memory unit 128. A differential voltmeter 94 is connected between the servo memory unit 128 and the second testing position 124. The two meters 92, 94 may be any one of a number of well known relay types such as those known commercially as the Sensitrol and Simplytrol types. The relay contacts of the two meters 92, 94 are connected into the automatic control system located in the control console 116.

In operation, an operator places tubes 110 to be tested in the sockets 118 of the boxes 108. The boxes 108 are then placed at the beginning of the track 102. In response to signals from the control system in the control console 116, the actuator 114 advances the boxes 108 one position at a time down the track 102. The control system 116 may, as described above, be arranged so that the boxes 108 do not advance unless all tests are completed at all testing consoles 104 and unless all tubes 110 have passed their particular tests. If a tube 110 fails a test, the operator may take cognizance of the failure by operating a resume testing switch in the control system. This allows the operator to remove or mark the defective tube 110.

As the boxes 108 progress to the end of the track 102, the operator removes them from the track 102, replaces the tested tubes 110 with tubes 110 to be tested, and restarts them at the beginning of the track 102.

When a tube 110 (the first tube 10 of FIG. 1) has reached the first testing position 120 of the transconductance tester 106, the tube 110 immediately ahead (the second tube 68 of FIG. 1) will be located at the second testing position 124 of the transconductance tester 106. These tubes 110 are connected into the first and second electronic circuit means respectively by means of the sockets 118, the contacts 119 on the bottom of the boxes 108 and the segmental contact bars 117 in the track 102. The first tube 110 (tube 10 of FIG. 1) has normal filament or heater voltage applied to it as described in conjunction with FIG. 1. The preceding tube 110 (tube 68 of FIG. 2) has a reduced filament or heater voltage applied to it.

Hereafter it may be seen that the operation corresponds to that previously given for FIG. 1. The oscillator 12 applies a signal to the tubes 110 at the two testing positions 120, 124. The first tube 110 (tube 10 of FIG. 1) provides a signal indicative of its transconductance at normal filament voltage. The second tube 110 (tube 68 of FIG. 1) produces a signal indicative of its transconductance at reduced filament voltage. The signals are amplified and rectified in the first and second amplifier sections 122, 126 respectively.

Referring now where necessary to FIG. 1, the servo memory unit 128, in response to the signal proportional to the transconductance of the first tube 10 at normal filament voltage, positions the second follow-up potentiometer 42 and the second memory potentiometer 62. The normal transconductance meter 92 will indicate whether the first tube 10 has a satisfactory transconductance. The relay contacts on the normal transconductance meter 92 will supply information to the control system that this test is complete and whether the first tube 10 has passed or failed.

Simultaneous with the measurement of the first tube 10, the signal proportional to the transconductance of the second tube 68 at reduced filament voltage will be compared with the voltage at the slider of the first memory potentiometer 60 by the differential voltmeter 94. The differential meter 94 will indicate whether the delta transconductance of the second tube 68 is within allowable limits. The relay contacts on the differential meter 94 will supply information to the control system that this test is complete and whether the second tube 68 has passed or failed.

If all tests are complete, and no tubes 110 have failed, the three switches 50, 56 and 66 in the transconductance tester may be switched by the control console 116 to the alternate position and all boxes 108 will be advanced one position down the track 102.

Thus there has been described a method and apparatus for automatically and rapidly measuring both normal transconductance and delta transconductance of a wide variety of electron tube types compatibly in a high rate tube testing system.

Obviously, many modifications and variations of the present invention are possible in the light of the above teachings. It is therefore to be understood that, within the scope of the appended claims, the invention may be practiced otherwise than as specifically described.

What is claimed is:

1. A circuit for dynamically testing an electron device comprising: electronic circuit means producing first and second signals indicative of the dynamic characteristics of said electron device in first and second operating conditions, respectively, signal storage means connected to said circuit means for storing said first signal produced by said circuit means, and difference means connected between said circuit means and said signal storage means for computing and indicating the difference between said first and second signals produced by said circuit means.

2. A circuit for dynamically testing an electron device comprising: means for operating said electron device in first and second conditions, amplifying means connected to said first named means for producing first and second signals indicative of the dynamic characteristics of said electron device in said first and second operating conditions, respectively; signal storage means connected to said amplifying means for storing said first signal produced by said amplifying means, and difference means connected between said amplifying means and said signal storage means for computing and indicating the difference between said first and second signals produced by said amplifying means.

3. In combination, first electronic circuit means for producing signals indicative of the characteristics of a vacuum tube in a first operating condition, second electronic circuit means for producing signals indicative of the characteristics of a vacuum tube in a second operating condition, said first and second circuit means being adapted to have a vacuum tube sequentially connected into the respective circuit of said first and second circuit means, signal storage means connected to said first circuit means for storing the signals produced by said first circuit means, and comparison means connected between said second circuit means and said signal storage means for indicating the difference between the signals produced by said first and second circuit means.

4. In combination, a signal generator, a first amplifier connected to said signal generator and responsive to signals therefrom for producing amplified signals, a second amplifier connected to said signal generator and responsive to signals therefrom for producing amplified signals, said first and second amplifiers being adapted to have a vacuum tube sequentially connected into the respective circuits of said amplifiers, the heater voltage applied to the vacuum tube being of a first predetermined value when the tube is connected into said first amplifier and a second predetermined value when the tube is connected into said second amplifier, a potentiometer having a slider, translating means electrically connected to said first amplifier and mechanically coupled to the slider of said potentiometer for positioning the slider in accordance with amplified signals from said first amplifier, a source of potential connected across said potentiometer, and a differential indicator connected between said second amplifier and the slider of said potentiometer for indicating the difference between the amplified signals produced by said second amplifier and the potential appearing at the slider of said potentiometer.

5. In combination, an oscillator for generating signals, a first amplifier having an input terminal and an output terminal, the input terminal of said first amplifier being connected to said oscillator and responsive to signals therefrom, a position servo having an input terminal, a first rectifier interconnected between the output terminal of said first amplifier and the input terminal of said servo, a second amplifier having an input terminal and an output terminal, the input terminal of said second amplifier being connected to said oscillator and responsive to signals therefrom, said first and second amplifiers being adapted to have a vacuum tube selectively coupled into the respective circuits of said amplifiers, the heater voltage applied to the vacuum tube being of a first predetermined value when the tube is coupled into said first amplifier and of a second predetermined value when the tube is coupled into said second amplifier, a meter connected to the input terminal of said servo, a first clutch coupled to said servo and driven thereby, a second clutch coupled to said servo and driven thereby, a first memory potentiometer having a slider, the slider of said first memory potentiometer being mechanically coupled to said first clutch, whereby the slider of said first memory potentiometer may be selectively positioned by said servo, a second memory potentiometer having a slider, the slider of said second memory potentiometer being mechanically coupled to said second clutch, whereby the slider of said second memory potentiometer may be selectively positioned by said servo, a source of potential, a variable resistor, said source of potential being connected across said first and second memory potentiometers through said variable resistor, a differential meter having first and second terminals, a second rectifier connected between the output terminal of said second amplifier and the first terminal of said differential meter, and means for selectively connecting the second terminal of said differential meter to the slider of either said first or second memory potentiometer.

6. In combination, an oscillator for generating signals, a first amplifier having an input terminal and an output terminal, the input terminal of said first amplifier being connected to said oscillator and responsive to signals therefrom, a servo amplifier having an input terminal and an output terminal, a first rectifier interconnected between the output terminal of said first amplifier and the input terminal of said servo amplifier, a second amplifier having an input terminal and an output terminal, the input terminal of said second amplifier being connected to said oscillator and responsive to signals therefrom, said first and second amplifiers being adapted to have a vacuum tube selectively coupled into the respective circuits of said amplifiers, the heater voltage applied to the vacuum tube being of a first predetermined value when the tube is coupled into said first amplifier and of a second predetermined value when the tube is coupled into said second amplifier, a meter connected to the input terminal of said servo amplifier, a motor connected to the output terminal of said servo amplifier and responsive to signals therefrom, a first clutch coupled to said motor and driven thereby, a second clutch coupled to said motor and driven thereby, a first servo potentiometer having a slider, the slider of said first servo potentiometer being mechanically coupled to said first clutch, whereby the slider of said first servo potentiometer may be selectively positioned by said motor, a second servo potentiometer having a slider, the slider of said second servo potentiometer being mechanically coupled to said second clutch, whereby the slider of said second servo potentiometer may be selectively positioned by said motor, a first memory potentiometer having a slider, the slider of said first memory potentiometer being mechanically coupled to the slider of said first servo potentiometer, a second memory potentiometer having a slider, the slider of said second memory potentiometer being mechanically coupled to the slider of said second servo potentiometer, a source of potential connected across said first and second servo potentiometers, means for selectively connecting the input terminal of said servo amplifier to the slider of either said first or second servo potentiometer, a variable resistor, said source of potential being connected across said first and second memory potentiometers through said variable resistor, a differential meter having first and second terminals, a second rectifier connected between the output terminal of said second amplifier and the first terminal of said differential meter, and means for selectively connecting the second terminal of said differential meter to the slider of either said first or second memory potentiometer.

References Cited in the file of this patent

UNITED STATES PATENTS

| | | |
|---|---|---|
| 1,365,734 | Shackleton | Jan. 18, 1921 |
| 1,718,557 | Hickok | June 25, 1929 |
| 1,854,901 | Goodwin | Apr. 19, 1932 |
| 2,278,697 | Gould | Apr. 7, 1942 |
| 2,590,116 | Moland et al. | Mar. 25, 1952 |
| 2,873,424 | Lowery | Feb. 10, 1959 |